(12) United States Patent
Voit et al.

(10) Patent No.: US 7,197,822 B2
(45) Date of Patent: Apr. 3, 2007

(54) METALLIC HONEYCOMB STRUCTURE AND PROCESS FOR PRODUCING THE SAME

(75) Inventors: Michael Voit, Leverkusen (DE); Jürgen Peters, St. Augustin (DE); Ferdi Kurth, Mechernich (DE); Ludwig Wieres, Overath (DE)

(73) Assignee: Emitec Gesellschaft für Emissionstechnologie mbH, Lohmar (DE)

( * ) Notice: Subject to any disclaimer, the term of this patent is extended or adjusted under 35 U.S.C. 154(b) by 0 days.

(21) Appl. No.: 11/318,898

(22) Filed: Dec. 27, 2005

(65) Prior Publication Data

US 2006/0096093 A1 May 11, 2006

Related U.S. Application Data

(63) Continuation of application No. PCT/EP04/06203, filed on Jun. 9, 2004.

(30) Foreign Application Priority Data

Jun. 27, 2003 (DE) ................................. 103 29 002

(51) Int. Cl.
- *B23P 15/00* (2006.01)
- *F01N 3/28* (2006.01)
- *B01J 35/04* (2006.01)
- *B23K 1/00* (2006.01)
- *B23K 101/02* (2006.01)

(52) U.S. Cl. ............................ 29/890; 29/428; 29/505; 228/181; 422/180; 502/527.22; 428/593

(58) Field of Classification Search ..................... None
See application file for complete search history.

(56) References Cited

U.S. PATENT DOCUMENTS

| | | | |
|---|---|---|---|
| 4,273,681 A | 6/1981 | Nonnenmann | |
| 4,619,912 A | 10/1986 | Jalbing et al. | |
| 4,803,189 A | 2/1989 | Swars | |
| 4,832,998 A | 5/1989 | Cyron | |
| 4,923,109 A | 5/1990 | Cyron | |
| 4,946,822 A | 8/1990 | Swars | |
| 5,045,403 A | 9/1991 | Maus et al. | |
| 5,102,743 A * | 4/1992 | Maus et al. | 428/593 |

(Continued)

FOREIGN PATENT DOCUMENTS

DE 29 02 779 A1 7/1980

(Continued)

*Primary Examiner*—John J. Zimmerman
(74) *Attorney, Agent, or Firm*—Laurence A. Greenberg; Werner S. Stemer; Ralph E. Locher

(57) ABSTRACT

A honeycomb structure includes a plurality of substantially parallel channels, a layer of at least partially structured metal foils and a housing. The layer includes a number N of at least partially structured metal foils and a number N+1 of smooth metal foils. The number N=1, 2 or 3 and two of the smooth metal foils are exterior foils. A method for producing such a honeycomb structure is also provided. The honeycomb structure is used, in particular in exhaust gas systems of mobile internal combustion engines.

15 Claims, 3 Drawing Sheets

U.S. PATENT DOCUMENTS

| | | |
|---|---|---|
| 5,105,539 A | 4/1992 | Maus et al. |
| 5,130,208 A | 7/1992 | Maus et al. |
| 5,135,794 A | 8/1992 | Maus et al. |
| 5,139,844 A | 8/1992 | Maus et al. |
| 5,157,010 A | 10/1992 | Maus et al. |
| 5,372,893 A * | 12/1994 | Usui .................. 428/593 |
| 5,403,559 A | 4/1995 | Swars |
| 5,480,621 A * | 1/1996 | Breuer et al. ............ 422/174 |
| 5,785,931 A | 7/1998 | Maus et al. |
| 6,029,488 A | 2/2000 | Wieres |
| 6,049,961 A | 4/2000 | Wieres |
| 6,049,980 A | 4/2000 | Wieres |
| 6,115,906 A | 9/2000 | Wieres |
| 6,136,450 A * | 10/2000 | Maus .................. 428/593 |
| 6,190,784 B1 | 2/2001 | Maus et al. |
| 6,226,867 B1 * | 5/2001 | Bruck et al. .............. 29/890 |
| 6,311,395 B1 | 11/2001 | Wieres |
| 6,505,396 B1 | 1/2003 | Wieres |
| 6,571,458 B2 | 6/2003 | Brück et al. |
| 2001/0009064 A1 | 7/2001 | Bruck et al. |
| 2001/0015087 A1 | 8/2001 | Diewald et al. |
| 2004/0152594 A1 | 8/2004 | Bruck et al. |

FOREIGN PATENT DOCUMENTS

| | | |
|---|---|---|
| DE | 8816154 U1 * | 2/1989 |
| DE | 40 25 434 A1 | 2/1992 |
| EP | 0 245 737 A1 | 11/1987 |
| EP | 0 460 611 A1 | 12/1991 |
| JP | 63-104653 * | 10/1988 |
| WO | 90/03220 | 4/1990 |
| WO | 90/08249 | 7/1990 |
| WO | 91/01178 | 2/1991 |
| WO | 91/01807 | 2/1991 |
| WO | 97/00135 | 1/1997 |
| WO | 97/00725 | 1/1997 |
| WO | 97/06358 | 2/1997 |
| WO | 97/49905 | 12/1997 |
| WO | 98/34725 | 8/1998 |
| WO | 03/008774 A1 | 1/2003 |

* cited by examiner

FIG. 4
Prior Art
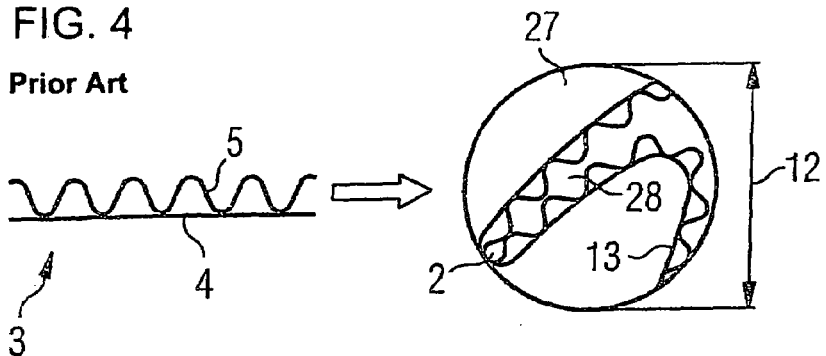
FIG. 5 A
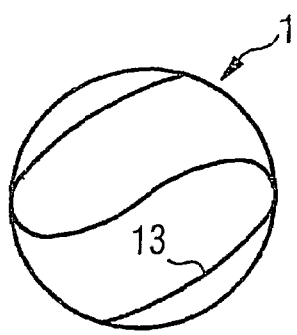
FIG. 5 B
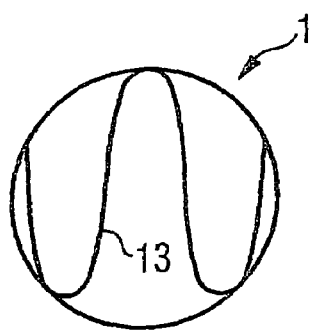
FIG. 5 C
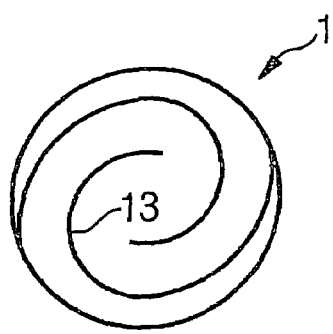
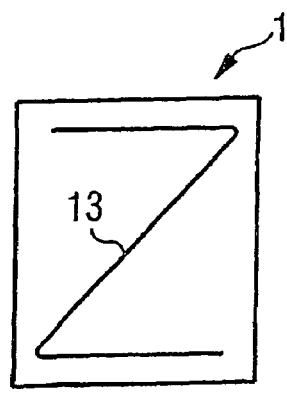
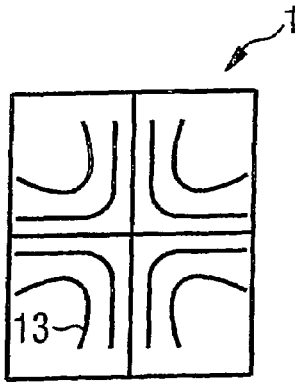
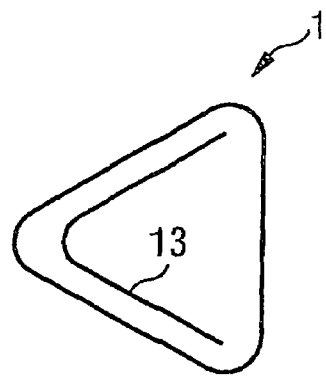
FIG. 5 D
FIG. 5 E
FIG. 5 F

METALLIC HONEYCOMB STRUCTURE AND PROCESS FOR PRODUCING THE SAME

CROSS-REFERENCE TO THE RELATED APPLICATION

This is a continuing application, under 35 U.S.C. §120, of copending International Application No. PCT/EP 2004/006203, filed Jun. 9, 2004, which designated the United States; this application also claims the priority, under 35 U.S.C. §119, of German Patent Application 103 29 002.8, filed Jun. 27, 2003; the prior applications are herewith incorporated by reference in their entirety.

BACKGROUND OF THE INVENTION

Field of the Invention

The invention relates to a honeycomb structure having a multiplicity of passages disposed substantially parallel to one another, at least one layer of at least partially structured sheet-metal foils and a housing. The invention also relates to a process for producing such a honeycomb structure. Honeycomb structures of this type are preferably used as a component for treating exhaust gases from mobile internal combustion engines.

Exhaust-gas purification components in exhaust systems of mobile internal combustion engines (such as for example spark-ignition or diesel engines) in motor vehicles, lawn mowers, chain saws, motorcycles, etc., generally have the object of converting or storing (at least for a certain period of time) pollutants contained in the exhaust gas. Known examples of exhaust-gas components of that type include catalytic converters, filters, absorbers or separators. The honeycomb structure provides a very large surface area which can come into contact with the exhaust gas flowing through it or past it. The resulting intimate contact with the exhaust gas leads to a high efficiency on the part of the exhaust-gas purification component.

Honeycomb structures of that type made from ceramic or metallic materials are fundamentally known. The person skilled in the art is aware of a large number of different manufacturing processes for producing such honeycomb bodies, in particular extrusion or the connection by technical joining of partial components, such as metal sheets, fibrous layers, grid structures or the like. The preferred manner of producing the technical joining connection is by brazing. However, a sintering process or even welding may be used as well. Due to the fact that exhaust-gas purification components of that type are always matched to the requirements (e.g. with regard to type or construction) of the internal combustion engine, it is desirable for it to be possible for a large number of different variants of honeycomb structures of that type to be produced in simple manufacturing processes. In the past, it has been found that metallic honeycomb bodies which are constructed, for example, from at least partially structured sheet-metal foils can be realized with a much greater range of variety without excessive modifications to the manufacturing process being required.

There are numerous known different construction options and production processes with regard to metallic honeycomb structures of that type. A distinction is drawn in particular between two typical constructions. An early construction, of which German Published, Non-Prosecuted Patent Application DE 29 02 779 A1, corresponding to U.S. Pat. No. 4,273,681, shows typical examples, is the helical construction, in which substantially one smooth and one corrugated sheet-metal layer are placed on top of one another and wound helically. In another construction, the honeycomb body is constructed from a multiplicity of alternately disposed smooth and corrugated or differently corrugated sheet-metal layers, the sheet-metal layers initially forming one or more stacks which are then intertwined. In that case, the ends of all of the sheet-metal layers come to lie on the outside and can be connected to a housing or tubular casing, producing numerous connections, which increase the durability of the honeycomb body. Typical examples of those constructions are described in European Patent EP 0 245 737 B1, corresponding to U.S. Pat. Nos. 4,946,822; 4,923,109; 4,832,998 and 4,803,189, or International Publication No. WO 90/03220, corresponding to U.S. Pat. Nos. 5,139,844; 5,135,794 and 5,105,539. It has also long been known to equip the sheet-metal layers with additional structures in order to influence the flow and/or bring about cross-mixing between the individual flow passages. Typical examples of those configurations include International Publication No. WO 91/01178, corresponding to U.S. Pat. No. 5,403,559, International Publication No. WO 91/01807, corresponding to U.S. Pat. Nos. 5,130,208 and 5,045,403, and International Publication No. WO 90/08249, corresponding to U.S. Pat. No. 5,157,010. Finally, there are also conical honeycomb bodies, optionally also with further additional structures for influencing the flow. A honeycomb body of that type is described, for example, in International Publication No. WO 97/49905, corresponding to U.S. Pat. No. 6,190,784. Furthermore, it is also known to leave free a cutout in a honeycomb body for a sensor, in particular for accommodating a lambda sensor. One such example is described in German Utility Model DE 88 16 154 U1. With regard to the production of honeycomb structures of that type, reference is made in particular to the following publications: International Publication No. WO 98/34725, corresponding to U.S. Pat. Nos. 6,571,458 and 6,226,867 and U.S. Patent Application Publication No. US 2001/0009064, International Publication No. WO 97/06358, corresponding to U.S. Pat. Nos. 6,311,395 and 6,049,980, International Publication No. WO 97/00725, corresponding to U.S. Pat. Nos. 6,115,906 and 6,029,488, and International Publication No. WO 97/00135, corresponding to U.S. Pat. Nos. 6,505,396 and 6,049,961.

With regard to the publications cited, structured and smooth sheet-metal foils are generally stacked alternately on top of one another and then wound and/or twisted in such a way that they assume an external configuration which substantially corresponds to the shape of the housing into which they are subsequently inserted. Under certain circumstances, those structured and smooth sheet-metal foils are disposed in stacks and/or layers, with the same number of smooth and structured sheet-metal foils being provided in each case. The sheet-metal foils which bear against one another in that way then form passages on each of the two sides, and the exhaust gas can flow through those passages.

In particular, in the case of honeycomb structures which are formed by using relatively short sheet-metal foils, technical problems may arise with the formation of connections by technical joining. For example, if the honeycomb structure has a maximum extent of less than 30 mm (in which case the sheet-metal foils are not wound helically), the situation may arise whereby contact regions occur within and/or between structured sheet-metal foils. That problem exists in particular if the layers are wrapped in an S-shape or in a similar way. The result thereof is that the structures engage inside one another and consequently at least some passages are malformed. That increases the risk of the passages becoming blocked, or at least of different coating thicknesses being produced, during subsequent coating of the honeycomb structure. That can lead, for example, to an increase in the flow resistance of the honeycomb structure at least in subregions. That can in turn give rise to different thermal stresses, lower conversion rates or even a reduction in the power of the upstream internal combustion engine. A further risk is that subsections which are inaccessible to the application of additional materials for forming connections by technical joining, such as for example brazing material, will be formed. Those subregions, which are subsequently not connected or not completely connected, can lead to the component being destroyed due to the extremely high thermal and dynamic loads which occur in the exhaust system.

SUMMARY OF THE INVENTION

It is accordingly an object of the invention to provide a metallic honeycomb structure and a process for producing the same, which overcome the hereinafore-mentioned disadvantages of the heretofore-known products and processes of this general type, which provide a honeycomb structure that has a simple construction, can be produced with a low outlay in terms of manufacturing technology, has a uniform formation of passages through which the exhaust gas can flow and has a reliable attachment of adjacent sheet-metal foils to one another and to the housing, and in which the process allows the production of a honeycomb structure, in particular with small dimensions, in a reliable way.

With the foregoing and other objects in view there is provided, in accordance with the invention, a honeycomb structure, comprising a housing, a multiplicity of passages disposed substantially parallel to one another within the housing, and a layer of at least partially structured sheet-metal foils defining the passages. The layer has a number N of at least partially structured sheet-metal foils, a number N+1 of smooth sheet-metal foils, the number N is 1, 2 or 3, and two of the smooth sheet-metal foils are outer sheet-metal foils.

In other words, this means in particular that the layer forms a type of sandwich in which the two outer sheet-metal foils are smooth. A sheet-metal foil is to be understood as being "smooth" in particular if it does not have any corrugations, stamped formations, folds, etc. However, this does not necessarily mean that the smooth sheet-metal foil has a specific (for example particularly low) surface roughness or that it is not, for example, wound in an S-shape or in a similar way. At least one, at least partially "structured" sheet-metal foil is disposed between the two outer, smooth sheet-metal foils.

It is fundamentally also possible for a plurality of sheet-metal foils to be disposed between the two outer smooth sheet-metal foils and to form the layer, in which case at least one of these additional sheet-metal foils is at least partially structured. By way of example, it is also practicable for a stack of a plurality of alternately disposed smooth and structured sheet-metal foils to be provided between the two outer smooth sheet-metal foils. Furthermore, it is conceivable for a sheet-metal foil, by way of example, to be only partially structured while at the same time also having smooth sections. In this case, the (smooth and) structured sheet-metal foils disposed in the interior at least partially form passage walls on both sides (i.e. on the large-area surfaces). By contrast, the configuration of the at least one layer to form a honeycomb structure is such that the outer smooth sheet-metal foils form passages only toward one side, namely toward the internally disposed, at least one at least partially structured sheet-metal foil. Toward the outside, these outer smooth sheet-metal foils preferably at least partially bear against themselves and/or against adjacent outer smooth sheet-metal foils and/or against the housing. These smooth sheet-metal foils nestle against one another in such a way that no passages through which the exhaust gas can flow are formed.

The provision of two outer smooth sheet-metal foils ensures that direct contact between sections of the structured sheet-metal foils disposed adjacent one another is avoided. This leads to a reduction in defects with regard to the construction of the honeycomb structure, so that a uniform distribution of the passages over the cross section of the honeycomb structure is ensured. The outer smooth sheet-metal foils bearing directly against one another also means that during a heat treatment of the honeycomb structure, for example as part of a brazing process, connections by technical joining are formed between these smooth sheet-metal foils. These connections have their origin primarily in diffusion phenomena, which lead to local diffusion welds. This ensures permanent connection of the layers to one another and/or the outer smooth sheet-metal foils disposed adjacent one another.

This also avoids the "telescoping" phenomenon, whereby adjacent layers move relative to one another due to the loads which occur in the exhaust system. Depending on the pressure with which the outer smooth sheet-metal foils disposed adjacent one another are pressed against one another and/or are introduced into the housing before the heat treatment, diffusion bonds of this type may form over the entire contact surface. If (in particular with regard to the thermal expansion properties of honeycomb bodies of this type) it is intended to prevent a complete join from being formed, it is possible for a substance which suppresses the formation in particular of diffusion bonds to be provided on the (smooth and/or structured) sheet-metal foils. By way of example, special coatings, such as titanium oxide, aluminum oxide, etc., are recommended for this purpose. However, passivation layers of this type may be disposed not only between the outer smooth sheet-metal foils but also, for example, between the smooth sheet-metal foils and the housing.

In accordance with another feature of the invention, the layer is wound and/or twisted to form the honeycomb body, in such a way that, at least in a subsection of the layer, outer smooth sheet-metal foils are disposed directly adjacent one another. This means in particular that there is a particularly high degree of bending or wrapping of the layer. Such extreme profiles, at which the smooth sheet-metal foils are constructed to bear against themselves, occur in particular in honeycomb bodies with a polygonal outer configuration, i.e. a configuration which differs from a cylindrical shape.

In particular, in order to reach even the corner regions of this polygonal outer configuration, it is necessary for there to be particularly tightly wound subsections which penetrate all the way into these corner regions. This is also to be understood as meaning in particular profiles in which the at least one layer is bent in a meandering form, i.e. is alternately bent in one direction and then another (opposite) direction (if appropriate with different radii of curvature). Due to these extreme deformations, there was always a risk of the sheet-metal foils of known honeycomb structures not being formed in a desired way, in particular because the known sheet-metal foil stacks had to be positioned in a complex way with respect to one another when planning production and then connected to one another by technical joining. This technical problem is eliminated by the provision of outer smooth sheet-metal foils.

In accordance with a further feature of the invention, a further smooth sheet-metal foil and a structured sheet-metal foil are disposed alternately between the outer smooth sheet-metal foils in the layer. Preferably, in each case, a structured sheet-metal foil is disposed adjacent the outer smooth sheet-metal foils. This is to be understood in particular as meaning a sandwich structure which is distinguished by two externally disposed, smooth sheet-metal foils and a plurality of inner sheet-metal foils. With regard to the inner sheet-metal foils, an alternating configuration of further smooth sheet-metal foils and structured sheet-metal foils is now proposed. These internally disposed, smooth and structured sheet-metal foils delimit passages through which the exhaust gas can flow on each of their two sides. This substantially symmetrical construction with alternating smooth and structured sheet-metal foils ensures the production of defined connections between smooth and structured sheet-metal foils in the vicinity of the extremities of the structured sheet-metal foils, in particular the corrugation peaks or corrugation valleys.

In accordance with an added feature of the invention, the sheet-metal foils of the layers each have two ends, at least 90% of these ends being connected to the housing at least in a sector, and preferably all of the ends being connected to the housing. It is clear from this in particular that the honeycomb structure has a configuration which deviates from a helical construction. If the layers are wound up helically, it is usual for half of all of the ends to be disposed in the center of the honeycomb structure, while the opposite ends of the layers or sheet-metal foils bear against the housing. In the particularly preferred configuration of the honeycomb structure described herein, the sheet-metal foils or sheet-metal layers are disposed in such a way that, starting from the housing, they extend into an inner region of the honeycomb structure, before ultimately coming to bear against the inner surface of the housing again by way of the opposite end.

The fact that these ends are connected or in contact at least in a sector takes into account the fact that, for example, the housing is constructed to be larger or smaller, and therefore not all of the inner surface of the housing necessarily has to be in contact with the sheet-metal foils. However (for example in the case of an S-shaped configuration of the layers), it is also possible for the ends of the layers not to be disposed uniformly over the circumference of the housing or the honeycomb structure, but rather for there to be partial circumferential sections in which all or some of the ends are disposed, with an outer smooth sheet-metal foil nestling against the inner side of the housing between them.

It is preferable to use technical joining techniques to connect the ends to the housing, i.e. the ends are brazed or welded to the housing. The percentage of the ends connected to the housing which is mentioned is to be understood in particular as meaning that the next highest integer number of ends is connected to the housing. For example, if the honeycomb structure is formed from 2 sheet-metal layers (as can be produced by using the process described below) which each include 2 smooth and 1 structured sheet-metal foil, the layers have a total of 12 ends. The statement that at least 90% of these ends are connected to the housing is in this context to be understood as meaning that at least 11 of these ends are connected to the housing (12×0.9=10.8⇒ next highest integer number of ends is 11).

In accordance with an additional feature of the invention, at least one sleeve is provided between the housing and the sheet-metal foils, the sheet-metal foils of the layer each have two ends, at least 90% of these ends are connected to the at least one sleeve at least in one zone, and preferably all of the ends are connected to the at least one sleeve. In principle, for explanation, reference is substantially made to the preceding paragraph. A significant difference between these two configurations is that in this case a sleeve is provided between the sheet-metal foils and the housing. This sleeve has the purpose of compensating for the different thermal expansion properties of the sheet-metal foils with respect to the housing. The housing, which is intended primarily to ensure the structural integrity of the honeycomb structure, has to be made relatively stable, for example using housing wall thicknesses of from 1 mm to 3 mm. By contrast, to realize a low area-specific heat capacity and to provide the largest possible surface area, the sheet-metal foils are used in very thin thicknesses, in particular with a sheet-metal thickness of less than 0.1 mm, most preferably even less than 0.03 mm. Due to the different area-specific heat capacities, a rigid connection between the sheet metal foils and the housing would entail the risk of the sheet-metal foils tearing or connections becoming detached. In order to avoid this, a sleeve which permits relative movements of the sheet-metal foils with respect to the housing is provided between the sheet-metal foils and the housing. With regard to the construction of sleeves of this type, reference is also made to International Publication No. WO 03/008774, corresponding to U.S. Patent Application Publication No. US 2004/0152594, the content of the disclosure of which is hereby also incorporated and referred to in full.

In accordance with yet another feature of the invention, the honeycomb structure has a mean extent perpendicularly to the profile of the passages which is less than 50 mm, in particular in a range from 20 mm to 30 mm. These relatively small honeycomb structures are a particular field of use for the layered construction with two outer smooth sheet-metal foils. One reason for this is that this relatively short layer is difficult to handle during production if an outer sheet-metal foil is structured. This layer in some cases has to be considerably deformed, during which the structured sheet-metal foil under certain circumstances may become wedged against itself or foils disposed adjacent it. Accordingly, a considerably improved, reliable execution of the production process in particular in the case of relatively small honeycomb structures is possible.

In accordance with yet a further feature of the invention, the layer has a length which is less than 500 mm, in particular in a range from 100 mm to 300 mm. The lengths of the sheet-metal layers mentioned herein differ considerably from those which were already known, where the ratio of the length of the layer being used to the diameter of the support is considerably greater. For example, a known honeycomb body with a diameter of, for example, 10 cm has a layer length which is greater by at least a factor of 20. Here, a ratio which is considerably smaller is preferably proposed, in particular less than 10 or even less than 8.

With the objects of the invention in view, there is also provided a process for producing a honeycomb structure. The process comprises forming at least one layer having at least one at least partially structured sheet-metal foil disposed between two outer smooth sheet-metal foils. The at least one layer is wound to form a multiplicity of passages disposed substantially parallel to one another. The at least one wound layer is introduced into a housing.

In this case it is preferable to form the at least one layer in such a way that a smooth sheet-metal foil, a completely structured sheet-metal foil and another smooth sheet-metal foil are disposed alternately on top of one another. However, it is also possible for the two outer smooth sheet-metal layers to be connected to one another or for a continuous smooth sheet-metal strip to be provided, for example forming a U-shaped envelope, in which case a structured sheet-metal foil is disposed therein. If a plurality of layers are used to construct the honeycomb structure, once again the outer smooth sheet-metal foil of one layer has an outer smooth sheet-metal foil of the adjacent layer disposed on it, etc. The plurality of layers can form a stack, which in principle is in turn delimited by smooth sheet-metal foils. With regard to the honeycomb structure which can be produced, reference is in principle made to the statements given above. It is also possible through the use of this process to produce honeycomb structures having a plurality of layers, for example having 2 to 5 layers.

The process step of "winding" is to be understood as meaning bending over, folding over, kinking and/or winding up the at least one layer. In this context, the at least one layer then has an outer shape or lateral surface which substantially corresponds to the configuration of the housing. It is preferable for the wound layer or the wound layer package to have a cross section which is slightly larger than the cross section enclosed by the housing. This produces a prestress ensuring that the ends of the sheet-metal layers bear flush against the inner surface of the housing. The area-based difference or the prestress in this case amounts to approximately on the order of magnitude of 2% to 5%.

Finally, the layer which has been wound in this way is at least partially introduced into a housing. Partial introduction of the at least one wound layer opens up the possibility of providing the outer, exposed ends of the at least one layer with additional materials, such as strips of brazing material, etc. Then, the at least one layer which has been prepared in this way can be positioned entirely within the housing at the desired position.

In accordance with another mode of the invention, 2 to 5 layers are formed, wound together and introduced into a housing.

In accordance with a further mode of the invention, the at least one layer is wound according to one of the following profiles: helical, S-shaped, M-shaped, W-shaped, Z-shaped, U-shaped, V-shaped, and meandering. The individual profiles are explained in more detail below with reference to the figures. These profiles can usually be recognized when the honeycomb structure is viewed end-on, i.e. in the direction of the passages. In particular, the smooth sheet-metal foils reveal a profile of this type.

In accordance with an added mode of the invention, the at least one layer of sheet-metal foils is formed in such a manner that further smooth and structured sheet-metal foils are disposed alternately between the outer smooth sheet-metal foils. Preferably, in each case a structured sheet-metal foil is disposed adjacent the outer smooth sheet-metal foils. With this type of configuration of the sheet-metal foils, the sheet-metal foils disposed between the outer smooth sheet-metal foils at least partially delimit passages on both sides, while the outer smooth sheet-metal foils delimit passages through which a fluid can flow only on one side. The other side of the outer smooth sheet-metal foils is required to bear against adjacent smooth sheet-metal foils, a sleeve or the housing.

In accordance with an additional mode of the invention, the winding is carried out by using a shaping tool which has at least two shaping jaws and at least one winding pin. The at least one layer is fed to the shaping tool in such a way that the at least one winding pin is positioned preferably approximately centrally with respect to the at least one layer and is in contact with the at least one layer. Then, the at least one winding pin is rotated until all of the ends of the sheet-metal foils of the at least one layer bear against at least one inner side of the shaping jaws. In this way it is possible to produce in particular S-shaped profiles of the layers quickly and reliably.

This process step is explained in more detail below with reference to the figures. At this point, it should also be noted that the shaping jaws are formed in such a way that they at least partially enclose substantially an outer shape which corresponds to the final outer configuration of the sheet-metal layers when they are to be inserted in the housing. The approximately central configuration of the winding pin means that during rotation both ends of the layer are turned simultaneously, and consequently the winding or twisting process can be carried out more quickly than, for example, in the case of helical winding of the layers with the winding pin disposed in the vicinity of one end of the layers or sheet-metal foils.

In accordance with yet another mode of the invention, the at least one layer, before being wound, is cut to a defined length. This length is less than 500 mm, and in particular in a range of from 100 mm to 300 mm. The length proposed herein is used in particular for honeycomb bodies having a small extent. It is preferable for all of the layers or sheet-metal layers which are used to produce the honeycomb structure to have the same length.

In accordance with yet a further mode of the invention, the at least one layer, prior to the cutting operation, is positioned in a shaping tool for the winding operation, i.e. in other words the sheet-metal layer is first of all introduced into the shaping tool and held or fixed by it. This has the advantage that the at least one layer no longer has to be transported after the cutting operation, but rather is already in the appropriate position for the winding process to be carried out. This in turn leads to a considerable time saving with regard to manufacture and also reduced handling costs.

In accordance with yet an added mode of the invention, before the at least one wound layer is introduced into the housing, at least one sleeve is positioned around the at least one layer and/or on an inner surface of the housing. In this case, it is preferable for the sleeve to be positioned in such a way that it is disposed substantially centrally with respect to the axial extent of the layer or the sheet-metal foils. Provisional fixing of the sleeve to the periphery of the wound layer or to the inner surface of the housing can be effected by auxiliary substances, such as adhesives, etc.

In accordance with a concomitant mode of the invention, after the at least one layer has been introduced into the housing, connections are formed by technical joining between the components of the honeycomb structure, with these components preferably being brazed to one another at least in subregions. If a sleeve is disposed between the at least one layer and the housing, this sleeve has relatively small connecting sections facing the housing, whereas it is preferably brazed to the at least one layer over the entire inner side.

Other features which are considered as characteristic for the invention are set forth in the appended claims.

Although the invention is illustrated and described herein as embodied in a metallic honeycomb structure and a process for producing the same, it is nevertheless not intended to be limited to the details shown, since various modifications and structural changes may be made therein without departing from the spirit of the invention and within the scope and range of equivalents of the claims, the features of which also lead to advantageous configurations in any desired combination with one another.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is an elevational view illustrating the construction of known honeycomb structures in accordance with the prior art; and FIGS. 5A–5F are end-elevational views illustrating various profiles of different exemplary embodiments of the honeycomb structure according to the invention.

DESCRIPTION OF THE PREFERRED EMBODIMENTS

Figure 1:
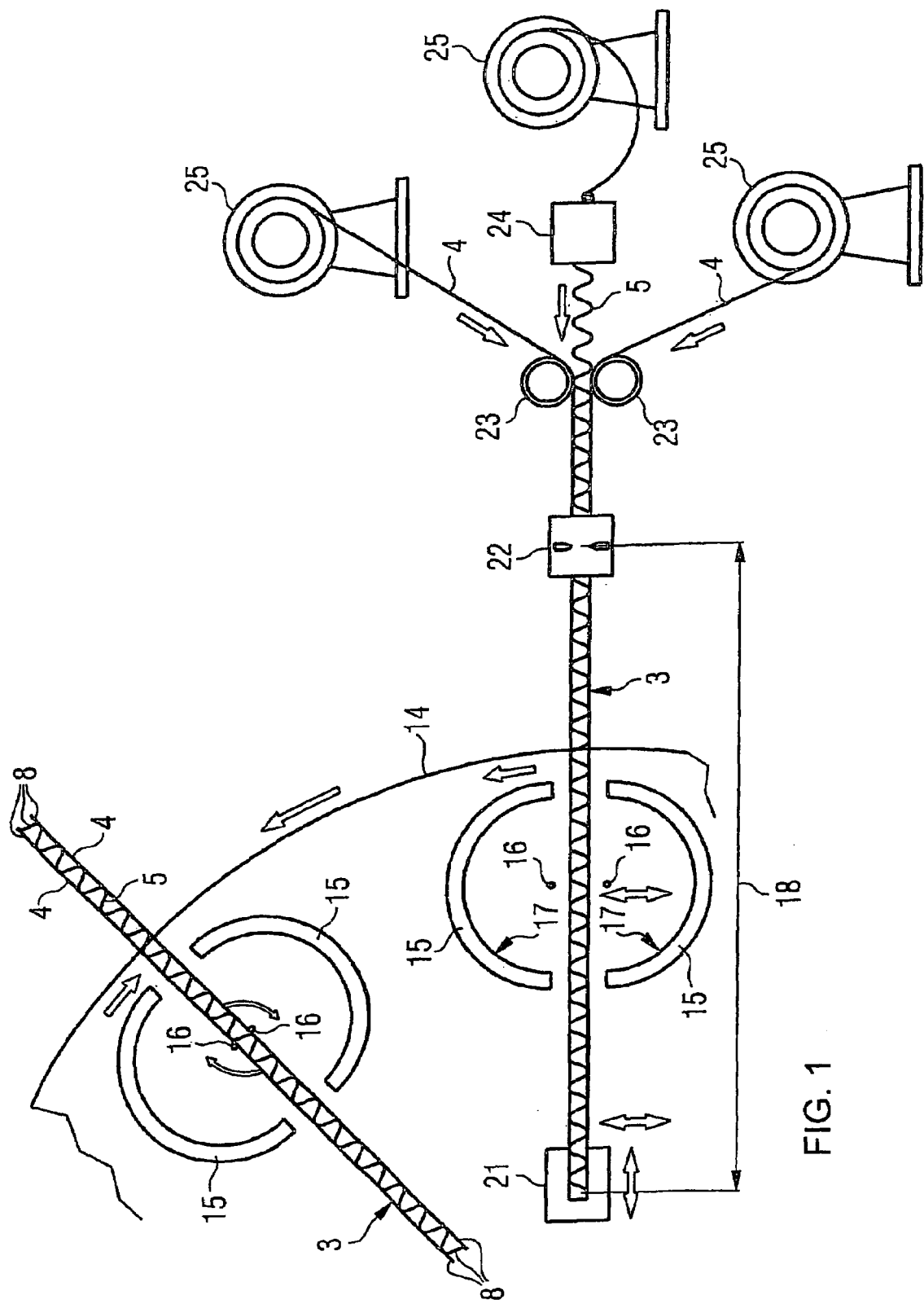
FIG. 1 is a fragmentary, diagrammatic, side-elevational view illustrating a process for the production of an exemplary embodiment of a honeycomb body according to the invention.
Figure 2:
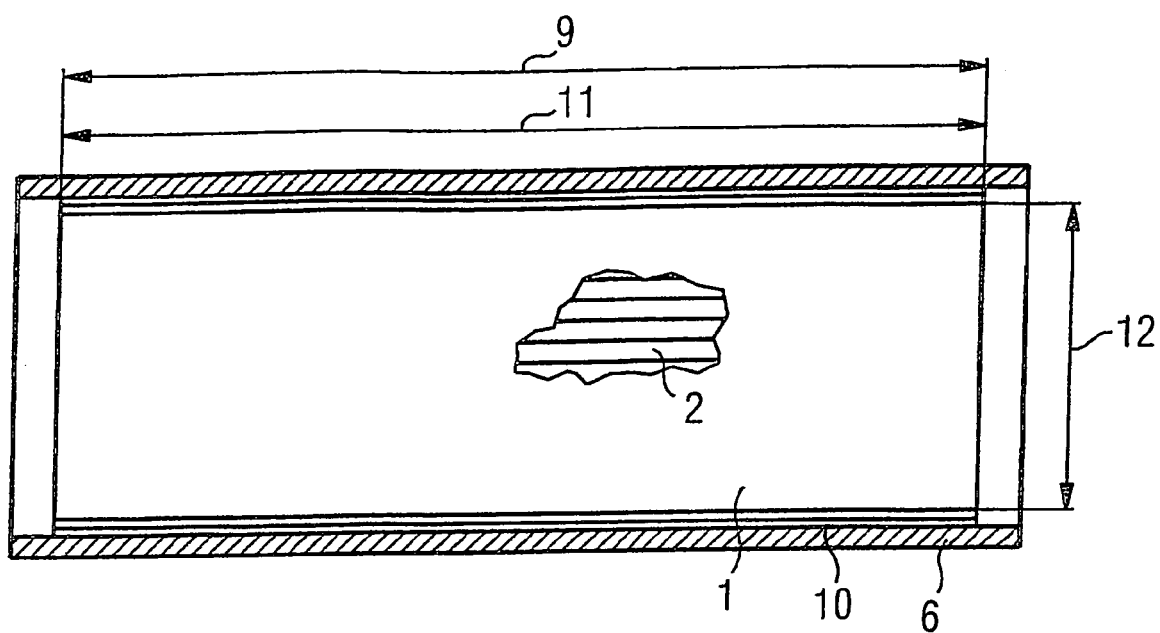
FIG. 2 is a partly broken-away, longitudinal-sectional view of an exemplary embodiment of a honeycomb structure according to the invention.
Figure 3:
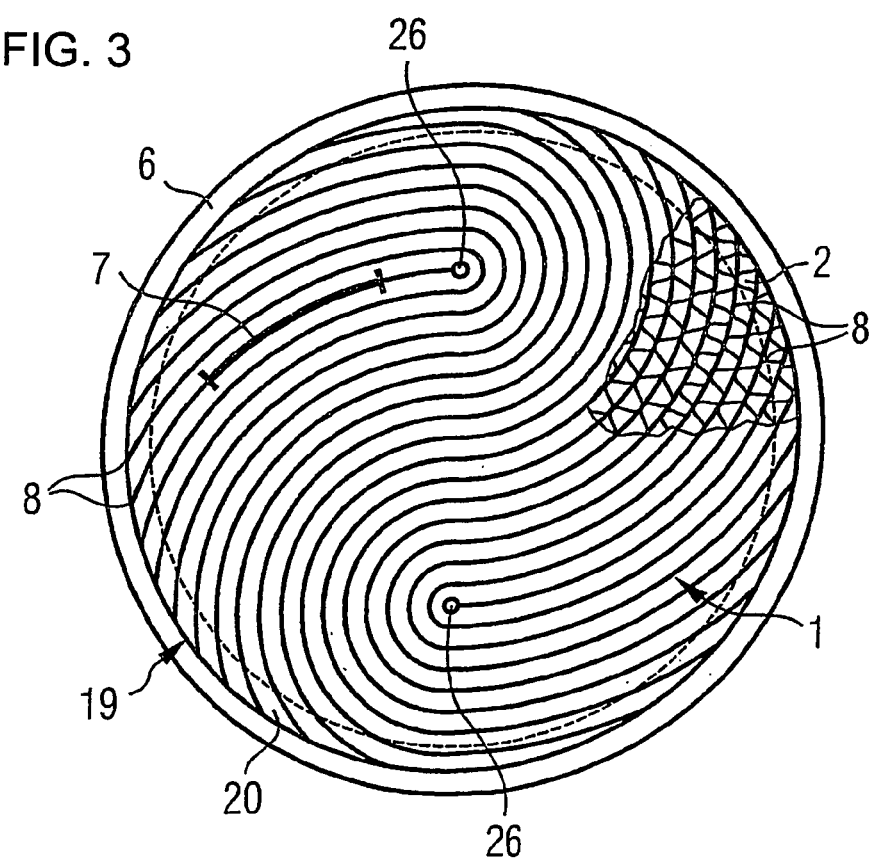
FIG. 3 is a partly broken-away, end-elevational view of an exemplary embodiment of the honeycomb structure which can be produced by the process according to the invention.

Referring now to the figures of the drawings in detail and first, particularly, to FIG. 1 thereof, there is seen a diagrammatic illustration of a process for producing a honeycomb structure having at least one layer 3 of at least partially structured sheet-metal foils or sheets 4, 5. A honeycomb structure 1 having a multiplicity of passages 2 disposed substantially parallel to one another and a housing 6, is seen in FIGS. 2 and 3.

As can be seen from the right-hand side of FIG. 1, the sheet-metal foils 4, 5 are unwound from coils 25. The sheet-metal foil 5 is fed to a structuring apparatus 24. The structure of the structured sheet-metal foil 5 is introduced into a previously smooth sheet-metal strip in the structuring apparatus 24. The smooth sheet-metal foils 4 from the upper and lower coils 25 are disposed on either side of the structured sheet-metal foil 5, with the metal sheets being passed through two rollers 23. This operation leads to the formation of a layer 3 which includes two outer smooth sheet-metal foils 4, between which at least one at least partially structured sheet-metal foil 5 is disposed. The rollers 23 are responsible for advancing the sheet-metal foils 4, 5 toward a shaping tool 14. With regard to the feeding of the sheet-metal foils 4, 5 toward the shaping tool 14, it is preferable for each sheet-metal foil 4, 5 to be unwound from a separate coil 25 and passed through between the rollers 23. In other words, during the production of a layer 3 which includes a number (x) of structured sheet-metal foils 5 and a number (x+1) of smooth sheet-metal foils 4, in total a number (2x+1) of coils 25 are provided and simultaneously and optionally continuously feed the sheet-metal foils 4, 5 to the shaping tool 14.

The shaping tool 14 has a holder 21 which orients the sheet-metal layer 3 with respect to the shaping tool 14. The layer 3 is oriented in such a way with respect to winding pins 16 or shaping jaws 15 that it can then be wound during a simple winding process. The shaping jaws 15 in this case are open and the layer 3 extends through the shaping jaws 15.

A cutting apparatus 22 is provided on the opposite side of the shaping jaws 15 from the holder 21 and positioned in such a way that the sheet-metal foils 4, 5 can be cut to a predetermined length 18. During the cutting process, the winding pins 16 are preferably brought into contact with the layer 3, so as to form a further holding point. After the sheet-metal foils 4, 5 have been severed, the shaping tool 14 which is illustrated herein as having a type of turntable, effects a further displacement, so that the stacked sheet-metal foils 4, 5 can be fed into the next holder 21 or next shaping jaws 15.

A layer 3 which has already been cut to length is shown in the section of the shaping tool 14 illustrated at the upper left. The winding pins 16 are now in contact with the outer smooth sheet-metal foils 4. As is indicated by arrows, the layer 3 is then rotated in such a way that all ends 8 of the sheet-metal foils 4, 5 bear against an inner surface 17 of the shaping jaws 15. For this purpose, the shaping jaws 15 can also be moved toward one another, so that they ultimately completely enclose the layer 3. The final bent layer 3 is then removed from the shaping jaws 15 and integrated in a housing 6 shown in FIGS. 2 and 3. Finally, connections are formed by technical joining between the sheet-metal foils 4, 5 and the housing 6, for example during a brazing process.

FIG. 2 diagrammatically illustrates a longitudinal section through an exemplary embodiment of the honeycomb structure 1 according to the invention with a housing 6 and a multiplicity of passages 2 disposed substantially parallel to one another and formed by the sheet-metal foils 4, 5. A sleeve 10 is disposed between the sheet-metal foils 4, 5 and the housing 6. The honeycomb structure 1 has an extent 12. The housing 6 in this case projects beyond end sides of the sheet-metal foils 4, 5. The connections by technical joining in this case are formed in such a way that at least 90% of the ends 8 (shown in FIGS. 1 and 3) of the sheet-metal foils 4, 5 are connected to a zone 11 of the sleeve 10. The sheet-metal foils 4, 5 are indirectly connected to a sector 9 of the housing 6 by this sleeve 10. The formation of connections by technical joining between the sleeve 10 and the sector 9 of the housing 6 in this case takes place in a region of the area which is smaller than the zone 11.

FIG. 3 shows an end-elevational view of a further exemplary embodiment of the honeycomb structure 1 according to the invention. The honeycomb structure 1 has a plurality of layers 3 with smooth and fully structured sheet-metal foils 4, 5, which form passages 2. The ends 8 of all of the sheet-metal foils 4, 5 bear against an inner surface 19 of the housing 6. The layers 3 have been wound into a honeycomb body 1 in such a way that in a subsection 7 outer smooth sheet-metal foils 4 are disposed directly adjacent one another. In particular, an S-shaped profile of the layers 3 has been formed around two winding points 26. After the layers 3 have been introduced into the housing 6, connections are formed by technical joining between the components of the honeycomb structure 1. These connections in this case are made in an end-side, outer subregion 20.

FIG. 4 diagrammatically illustrates how known honeycomb bodies of the prior art were produced. In that case, smooth sheet-metal foils 4 and structured sheet-metal foils 5 were alternately combined to form layers 3, each having the same number of smooth sheet-metal foils 4 and corrugated or structured sheet-metal foils 5 occurring in each layer 3 (i.e. the ratio of smooth sheet-metal foils to structured sheet-metal foils was 1:1). As can be seen from the right-hand illustration, deformation of these layers 3 led to the formation of contact regions 28 in which structured sheet-metal foil regions would bear against one another and/or be disposed directly adjacent one another in honeycomb bodies 27 formed therefrom. That occurred in particular if an S-shaped profile 13 was selected and the extent 12 was relatively small. As can be seen from FIG. 4, that led to a relatively irregular formation of passages 2, having an adverse effect on the efficiency of a honeycomb body of that type with regard to its subsequent intended use. That is avoided by the honeycomb structure 1 according to the invention.

FIG. 5 diagrammatically depicts examples of some profiles 13 of different honeycomb structures 1 according to the invention. In alphabetical order, these represent the following profiles 13: an S-shape in FIG. 5A, a W-shape in FIG. 5B, a helical shape in FIG. 5C, a Z-shape in FIG. 5D, a U-shape in FIG. 5E, and a V-shape in FIG. 5F.

The honeycomb structure proposed herein is particularly simple to produce and has a high, constant efficiency during its subsequent use in the exhaust system of mobile internal combustion engines. In particular, the honeycomb structure has a durable construction and is suitable in particular for extreme ambient conditions, for example in the immediate vicinity of the internal combustion engine.

We claim:

1. A process for producing a honeycomb structure, the process comprising the following steps:
   forming at least one layer having at least one at least partially structured sheet-metal foil disposed between two outer smooth sheet-metal foils;
   positioning the at least one layer in a shaping tool for a winding step;
   subsequently cutting the at least one layer to a defined length of less than 500 mm;
   subsequently winding the at least one layer to form a multiplicity of passages disposed substantially parallel to one another; and
   introducing the at least one wound layer into a housing.

2. The process according to claim 1, wherein between 2 and 5 of the layers are used in the forming, winding and introducing steps.

3. The process according to claim 1, which further comprises carrying out the step of winding the at least one layer to form a profile selected from the group consisting of helical, S-shaped, M-shaped, W-shaped, Z-shaped, U-shaped, V-shaped and meandering.

4. The process according to claim 1, which further comprises placing further smooth and structured sheet-metal foils alternately between the outer smooth sheet-metal foils in the step of forming the at least one layer.

5. The process according to claim 4, wherein a structured sheet-metal foil is disposed adjacent the outer smooth sheet-metal foils in each case.

6. The process according to claim 1, which further comprises:
   carrying out the winding step by using a shaping tool having at least two shaping jaws and at least one winding pin;
   feeding the at least one layer to the shaping tool with the at least one winding pin in contact with the at least one layer; and
   then rotating the at least one winding pin until all ends of the sheet-metal foils of the at least one layer bear against at least one inner surface of the shaping jaws.

7. The process according to claim 6, which further comprises positioning the at least one winding pin approximately centrally relative to the at least one layer.

8. The process according to claim 1, which further comprises cutting the at least one layer, before the winding step, to a defined length of from 100 mm to 300 mm.

9. The process according to claim 1, which further comprises positioning at least one sleeve around the at least one layer, before the step of introducing the at least one wound layer into the housing.

10. The process according to claim 1, which further comprises positioning at least one sleeve on an inner surface of the housing, before the step of introducing the at least one wound layer into the housing.

11. The process according to claim 1, which further comprises positioning at least one sleeve around the at least one layer and on an inner surface of the housing, before the step of introducing the at least one wound layer into the housing.

12. The process according to claim 1, which further comprises after the step of introducing the at least one layer into the housing, forming connections by technical joining between the sheet-metal foils, the at least one layer and the housing of the honeycomb structure.

13. The process according to claim 12, which further comprises also forming the connections by technical joining between at least one sleeve, the at least one layer and an inner surface of the housing.

14. The process according to claim 12, which further comprises forming the technical joining connections by brazing at least in subregions.

15. The process according to claim 13, which further comprises forming the technical joining connections by brazing at least in subregions.

* * * * *